United States Patent [19] [11] 4,198,370
Suzuki [45] Apr. 15, 1980

[54] METHOD OF MOLDING AND STRETCHING STOPPERS

[75] Inventor: Tadashi Suzuki, Saitama, Japan

[73] Assignee: Sato Gasei Co., Ltd., Tokyo, Japan

[21] Appl. No.: 851,191

[22] Filed: Nov. 14, 1977

Related U.S. Application Data

[63] Continuation of Ser. No. 643,768, Dec. 23, 1975, abandoned.

[51] Int. Cl.² .............................................. B29C 17/02
[52] U.S. Cl. ...................................... 264/291; 425/383
[58] Field of Search ............... 264/291, 299, 319, 328, 264/329; 24/150 FP; 425/DIG. 17, 805, 438, 404, 445, 446, 383

[56] References Cited

U.S. PATENT DOCUMENTS

| 3,380,122 | 4/1968 | Kirk | 264/291 |
| 3,577,987 | 5/1971 | Bronnenkant | 264/291 |
| 3,686,717 | 8/1972 | Mercer | 24/150 FP |
| 3,733,383 | 5/1973 | Bunney et al. | 264/291 |

Primary Examiner—James B. Lowe
Attorney, Agent, or Firm—Armstrong, Nikaido, Marmelstein & Kubovcik

[57] ABSTRACT

A blank of stoppers is molded from synthetic resin, each of said stoppers including a crossbar, a filament portion and a head. The filament portion has a smaller-diameter portion near the crossbar and a larger-diameter portion extending from the smaller-diameter portion toward the head at least on the portion to be stretched.

Metal mold members adapted to act as a drawing die are engaged to the connecting portion of the smaller-diameter and larger-diameter filament portions, and after the stoppers have been molded, the members forming the die are moved along the filament portion so that only the crossbars are gripped by the metal mold to prevent movement thereby subjecting the filament portions to stretching.

6 Claims, 21 Drawing Figures

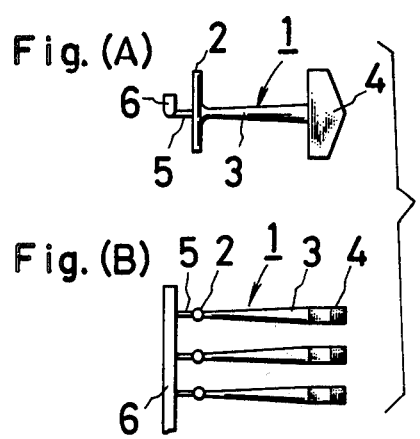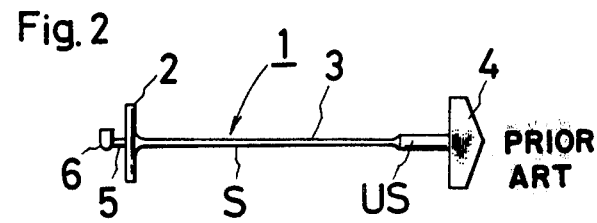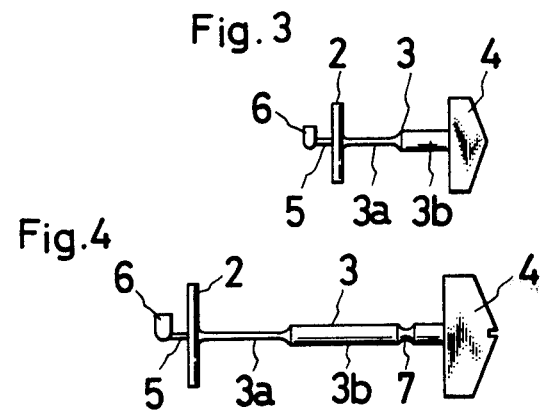

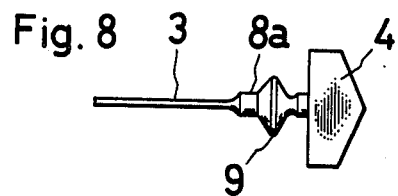
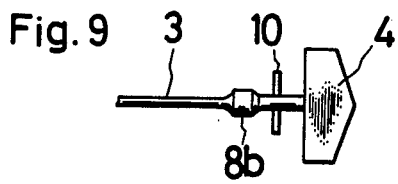
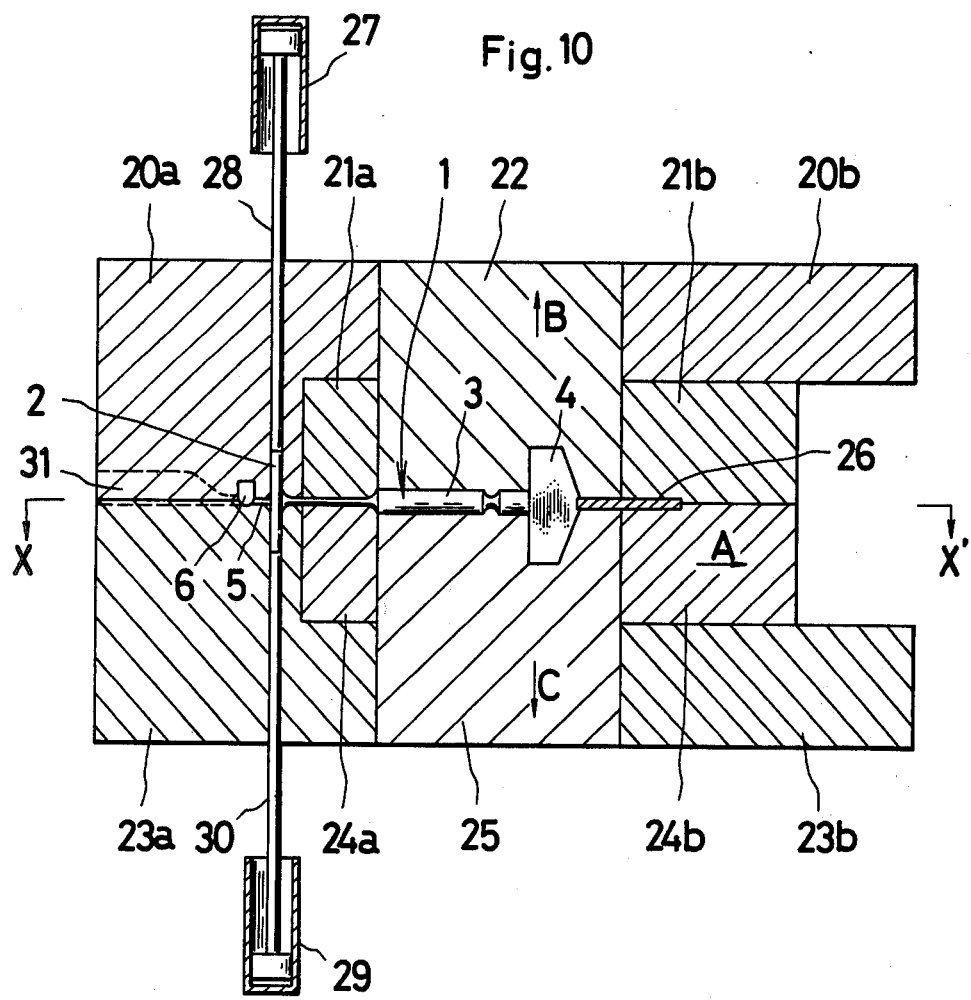

Fig. 17
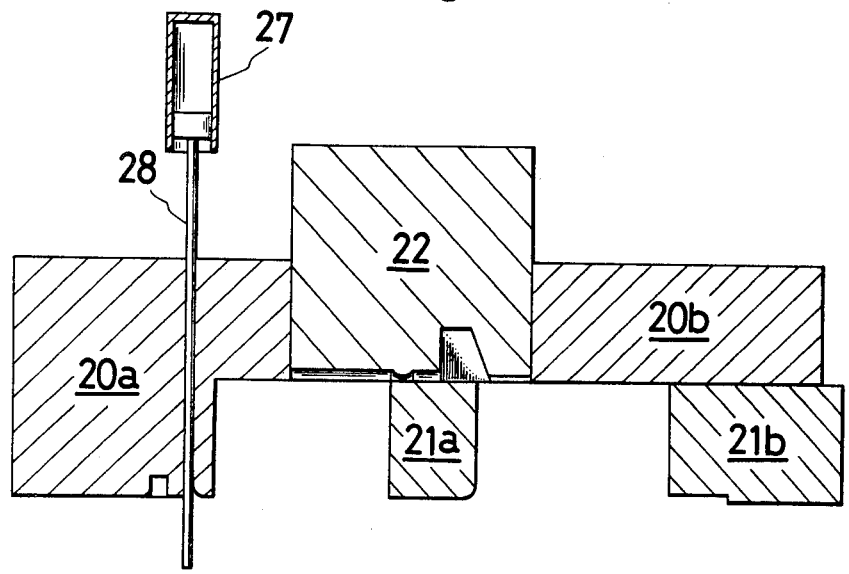
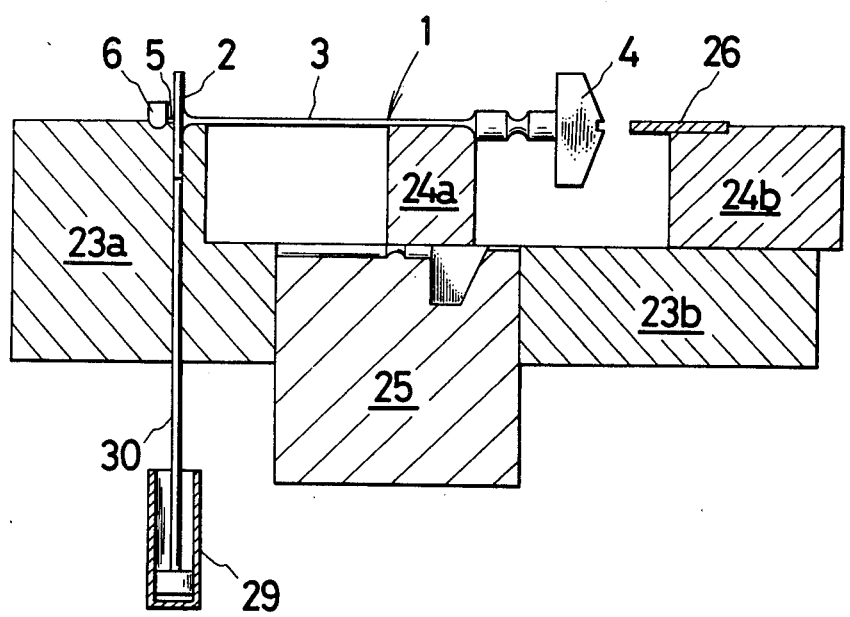

METHOD OF MOLDING AND STRETCHING STOPPERS

This is a continuation of application Ser. No. 643,768, filed Dec. 23, 1975, now abandoned.

BACKGROUND OF THE INVENTION

The present invention relates to a method of and apparatus for making stoppers of synthetic resin used for attaching price-labels and the like to wares or connecting a plurality of fibrous wares together.

Heretofore, the method of making stoppers for price-labels from synthetic resin, such as nylon, has been studied extensively. An original form of such stoppers was first introduced by the specification of U.S. Pat. No. 3,103,666 by Denisn Co., U.S.A., and thereafter various types of stoppers have been proposed. A stopper disclosed in the above U.S. Patent comprises a crossbar, a filament portion extending perpendicularly to said crossbar from its center and a head connected perpendicularly to said filament portion, to produce a deformed H-shape. A plurality of such stoppers are molded integrally in connected form. When said stoppers first developed each stopper was only molded integrally from sythetic resin. With such stopper it is necessary to make the filament portion as thin as possible so as not to damage cloth and other wares and also make them tough.

Because of the above requirements, the metal mold used for making stoppers is delicate, and burrs must be avoided in order to prevent damages of wares. One method of preventing production of burrs on a stopper is to increase the forming pressure of the metal mold; however since the metal mold has a fragile mold cavity, if the forming pressure is increased, the cavity portion of the mold will be deformed or in some cases the synthetic resin will leak through the contacting portions of the mold cavity thus resulting in the production of burrs.

These difficulties have thus caused serious problems in production of stoppers which have filament portions and which must not cause damage to wares.

For example, in the case where nylon is used, the material is melted at a temperature above the melting point thereof and then poured into the mold at a temperature below the melting point, the length of filament which can be satisfactorily molded is at most about 35 mm when the diameter of the filament portion is 1 mm. If this length is exceeded, burrs may be produced or the resin can not be readily poured into the metal mold. Also, the filament portion having a diameter of 1 mm tends to damage fibrous wares. Under such circumstances, if the diameter of the filament portion is about 0.6 mm, the length which is able to be molded is about 12~13 mm and in many stoppers the melted resin will not fill up to the head. The molded resin does not have molecular orientation, and therefore its strength is very low. Also it is brittle and in the filament form the resin is not suitable for use.

Accordingly, it has been proposed that the filament portion be subjected to stretching to make the diameter thereof thin thus increasing the strength.

As stretching methods for the filament portion of the stoppers, there are methods of stretching a molded blank of stoppers manually or automatically at room temperature or at a elevated temperature, and another method for using a metal mold and subjecting the molded blank to stretching immediately after the molding.

A method of stretching the filament portion of the stopper using a metal mold is known from, for example, Japanese Patent Application Publication No. 37,100/71. In this method, a split metal mold is used to mold and stretch the stopper blank, and has the advantage of avoiding the operation of removing the blank from the mold and feeding it to a stretching device.

The stretching of the filament portion produces the characteristic that the cross-sectional area thereof is reduced and the strength thereof increased greatly due to the molecular orientation, however there may be many cases wherein such features are a drawback. In other words, if the wares are attached with price-labels by means of stoppers, it is necessary to remove the label and stopper from the ware at the stage where the ware is purchased by a consumer. However, if the filament portion is substantially strengthened by stretching, it is difficult to remove the stopper from the wares and forcible removement will lead to damage of the wares.

Besides, these stretching methods have a substantial problem. In Japanese Patent Application Publication No. 37,100/71, as shown in FIGS. 6~8 of the Publication, the crossbar and head are seized by the abutting portions of the metal mold so as to effect stretching of the blank. Thus stretching tension must be applied to the whole length of the filament portion and if there is a relative weak portion in the filament portion, it may break off at that weak point.

Another problem in stretching by supporting both ends of the filament portion by the crossbar and head and applying tension to the portion, is that a larger stretching tension is necessary thus causing the stretching speed (moving speed of metal mold) to be increased too much. Further, if the timing of opening and closing of the metal mold is incorrect, the filament portion may be cut off and uneven stretching may occur.

In the manufacturing of synthetic fibres, the step of stretching fibres in the unstretched state is unavoidable. In this step it is important to make the diameter uniform and stretch at a high speed. Particularly, in the case of stretching fibres (bristles) of larger diameter, it is necessary to positively cause necking thereby making the stretched and unstretched portions distinct. Therefore attention has been directed on how to produce necking of desired shape at a desired position.

When comparing the stretching methods of synthetic fibres with that of Japanese Patent Application Publication No. 37,100/71, a substancial difference is recognized. Thus, in the Publication No. 37,100/71, the crossbar and head provided at both ends of the filament portion are caught by abutting portions of the metal mold and stretching is performed, so that there is no means of positively causing a stretching point, namely necking, resulting in easily producing uneven stretching. Particularly in the case where the filament portion is stretched with a part thereof being left in an unstretched state in order to adjust the length, the stretched part is not necessarily produced at a certain position, and the unstretched part may be produced, for example, at the center of the filament portion or near the crossbar.

The strength of the filament portion connected to the crossbar is very significant. Thus, if this portion is highly stretched, the strength will increase and the portion become thin. When it is guided through the needle of an attaching device, it can not be broken, and after the crossbar is passed through a ware, the filament portion is immediately extended and the crossbar returns to a position making a right angle to the filament portion.

The above problems can be summarized as follows:

(A) The filament portion of the stopper must be stretched at least at the portion near the crossbar.

(B) A plurality of filament portions of the stoppers must be stretched at the same time and uniformly.

(C) The filament portion of the stopper must have sufficient strength, but must have the property that it can be removed from wares easily.

(D) If an unstretched part is left in the filament portion of the stopper, it is desirably left as near the head as possible.

(E) In the stretching of the filament portion, it is necessary to make the stretching tension as low as possible so as not to cut the filament portion off or produce deformation of the crossbar.

Also the stretching method which can use a higher stretching speed must be used. It is also necessary to apply a stretching tension locally thereby reducing influence on the other part.

SUMMARY OF THE INVENTION

It is an object of the present invention to provide a method and apparatus which avoids the drawbacks of the prior art and meets the above requirements.

It is a further object of the present invention to provide a simple and effective means for producing stoppers having no burr.

These and other objects are accomplished by the present invention in which the filament portion is not stretched with the crossbar and head caught by the abutting portions of the metal mold, but is stretched in such a manner that the filament portion is engaged with a die part and a force is applied to draw this portion through the die part so as not to apply any stretching tension to the head.

The nature of the present invention will become more fully apparent from a consideration of the following description of an examplary embodiment of the present invention, taken in conjunction with the accompanying drawings.

BRIEF DESCRIPTION OF THE DRAWINGS

FIG. 1 (A) and FIG. 1 (B) are a front view and a side view respectively showing a blank of a group of prior art stoppers.

FIG. 2 is a front view showing a finished product of a group of stoppers after stretching of the filament portion of the blank shown in FIG. 1.

FIGS. 3 and 4 are front views showing a blank of a group of stoppers of the present invention.

FIG. 5 is a front view showing a group of stoppers obtained by stretching the blank shown in FIG. 4.

FIGS. 6 and 7A are front views showing other groups of stoppers of the present invention. 7B and 7C show cross-section views of the two portions of the stoppers of 7A.

FIGS. 8 and 9 are front views each showing a modified filament portion of a stopper of the present invention.

FIG. 10 is a sectional side view showing an apparatus for making stoppers of the present invention.

FIGS. 16 through 18 are sectional side views showing the apparatus with portions further separated.

DESCRIPTION OF THE PREFERRED EMBODIMENT

Figure 11:
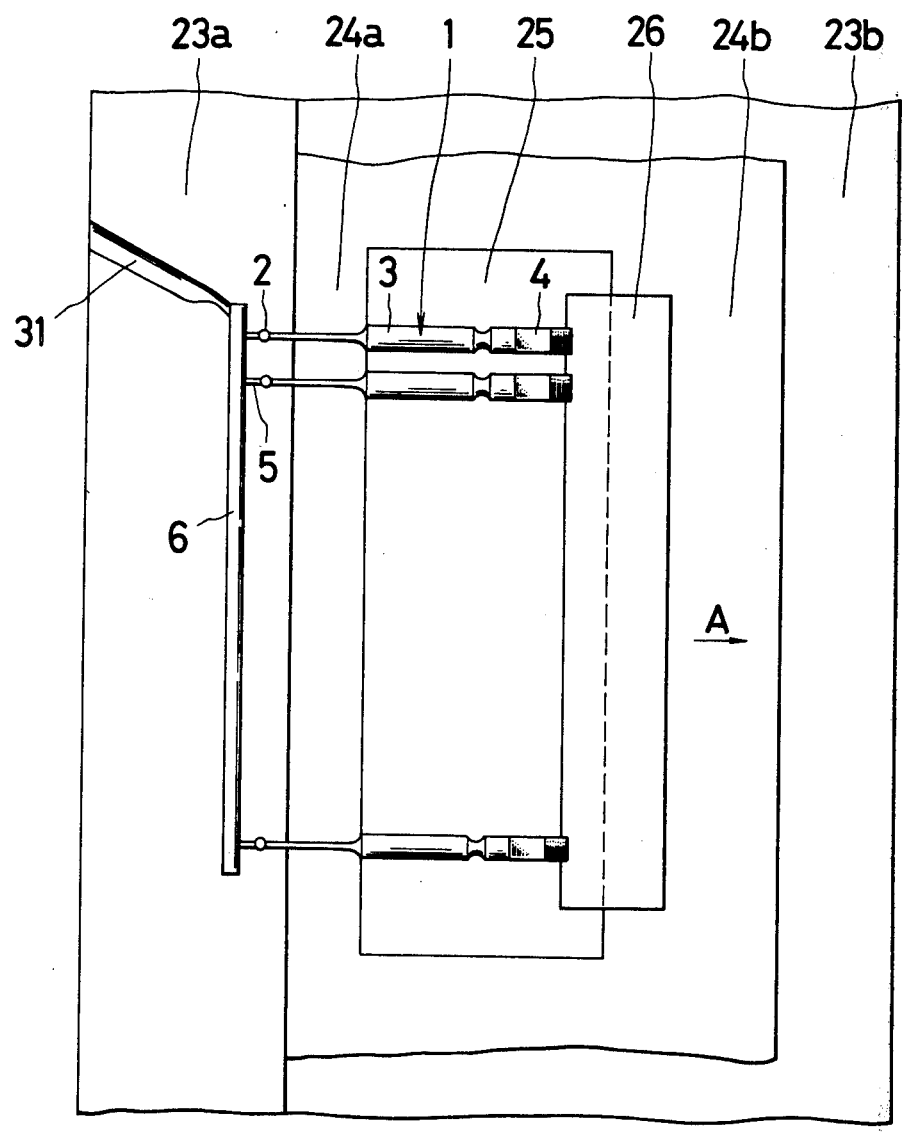
FIG. 11 is a sectional view of FIG. 10 along section lines x–x'.

FIGS. 1 (A and B) shows the shape of a blank of stoppers after molding according to the prior art, the FIG. 1 (A) being a front view and 1 (B) a side view thereof. Stopper 1 comprises a crossbar 2, a filament portion 3 and a head 4. A plurality of such stoppers are connected through thread portions 5 by a connecting bar 6, and these are molded in one body in such an arrangement, the number of stoppers in one group being for example about 20~50. The connecting bar 6 serves to facilitate handling of a group of stoppers 1, and also serves as a guide when the group of stoppers are placed in an attaching device and as a runner at the time of molding. The thread portions 5 serve to connect the stoppers 1 with the connecting bar 6 and also serve as a runner for transferring resin poured from a cavity of the connecting bar to the cavity of the stoppers. Accordingly, in the molding of stoppers, stretching of filament portions, packaging, and placing into an attaching device, a plurality of stoppers are fabricated so that they are attached to a connecting bar like a comb.

A blank of stoppers molded in the manner described above, in the case of Japanese Patent Application Publication No. 37,100/71, is stretched in such a manner that the crossbar 2 and head 4 are caught in a split metal mold and tension is applied between the crossbar and head by moving the split mold parts away, with the result that the filament portion 3 is stretched as shown in FIG. 2. As shown in FIGS. 1A and B, the filament portion is molded so as to have a smaller cross section near the crossbar 2 and a larger cross section near the head, so that stretching starts from near the crossbar 2 and then gradually moves toward the head 4. In FIG. 2, S shows the stretched portion and US shows the unstretched portion in the filament portion 1.

As described above, in a stopper of the prior art, a specific shape has been required due to the application of stretching tension to the whole of the filament portion by gripping the crossbar and head.

The present invention provides a method by which a blank of stoppers shown in FIG. 1 as well as stoppers shown in FIGS. 3 through 9 are produced.

FIG. 3 shows a blank of stoppers, the filament portion 3 of which is divided into two parts, namely a smaller-diameter filament portion 3a and a larger-diameter filament portion 3b.

According to the present invention, even if the filament portion has a gentle taper as shown in FIG. 1 (A), it can be stretched smoothly.

FIG. 4 is a front view showing another blank of stoppers. A stopper of this kind has a filament portion 3 composed of a smaller-diameter filament portion 3a and a larger-diameter filament portion 3b having a cut portion 7 of reduced cross section.

FIG. 5 shows the blank of stoppers shown in FIG. 4, the filament portion of which has been stretched in accordance with the present invention. If will be apparent that the cut portion 7 has not been affected by the stretching.

FIG. 6 shows the finished stopper product, which is formed with a cut portion 7a near head 4. As a blank for this stopper, a blank is used which has cut portion 7a that is formed by extending the cut portion 7 shown in FIG. 4 to near the head 4.

FIG. 7 (A) shows a stopper having a filament portion 3 having a head 8 of a modified form. As shown in FIG. 7 (B), the cross section through C is a, round shape, and, as shown in FIG. 7 (C) that through D is triangle, to produce an ornamental effect.

FIG. 8 shows a stopper which has an enlarged portion 9 in the neck portion 8a between the filament portion 3 and head 4. A label is supported between the enlarged portion 9 and head 4 and thus prevented from moving freely along the filament portion 3.

FIG. 9 shows a stopper which has a projection 10 in the neck portion 8b, and a label is supported between the projection 10 and head 4.

Next, a process for producing stoppers according to the present invention will be described below.

FIG. 10 is a cross sectional view showing a molding apparatus in position immediately after the molding of a blank of stoppers 1, and FIG. 11 is a cross sectional view taken along a line x–x' in FIG. 10.

The metal mold is largely divided into two parts, an upper mold part and a lower mold part, and these mold parts are further subdivided so as to provide movable portions.

The upper mold part is composed of upper mold members 20a, 20b, 21a, 21b and 22, and the lower mold part is composed of lower mold members 23a, 23b, 24a, 24b and 25. The lower mold member 24b has a support plate 26 fixed thereto. The mold member 20a is provided with push-out pins 28 operated by a piston 27. These pins are adapted to push out the crossbars 2 of the stoppers. The mold member 23a is provided with push-out pins 30 operated by a piston 29, and said pins are adapted to push the crossbars 2 out of the metal mold.

The lower mold part is rectangular in shape and formed by the members 23a and 23b in a body. On these members the members 21a and 21b of rectangular shape are mounted. The member 25 is mounted through said members. In the upper mold part, the members 20a and 20b are constructed to correspond to the lower mold members 23a and 23b respectively, and the members 21a and 21b to the lower mold members 24a and 24b, and also the member 22 to the lower mold member 25 respectively.

The upper mold member 20a and the lower mold member 23a are adapted to mold the connecting bar 6, the thread portion 5 and the crossbar 2 of the stopper 1. The upper mold part 21a and the lower mold part 24a are adapted to mold a part of the filament portion 3 and also serve to stretch the filament portion 3, and are constructed to move together with the members 21b and 24b in the direction shown by an arrow (A). The support plate 26 is fixed to the member 24b and adapted to temporarily hold the head 4 of the stopper 1.

The members 22 and 25 are adapted to mold a part of the filament portion 3 and the head 4, and for example the member 22 is moved in the direction shown by an arrow (B) and the member 25 in the direction shown by an arrow (C) so as to provide a space which allows movement of the members 21a, 21b, 24a and 24b in the direction shown by an arrow (A).

Next, the operation of the above apparatus will be explained.

Figure 12:
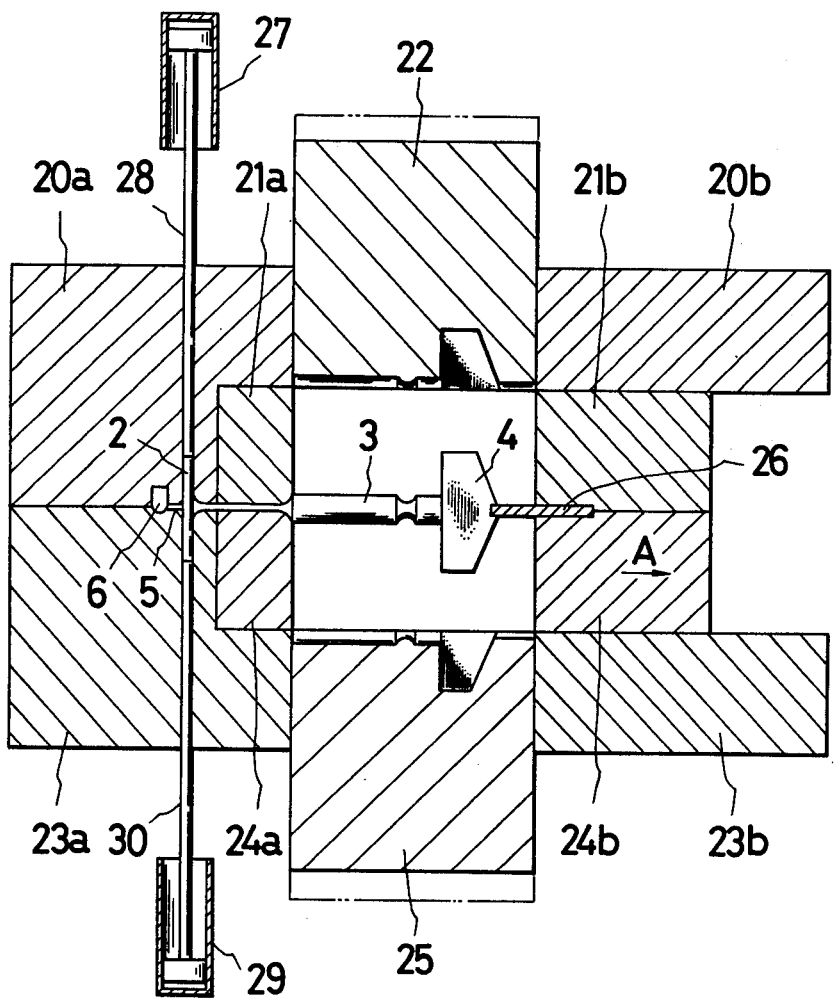
FIGS. 12 and 13 are sectional side views showing the apparatus with portions thereof moved apart.

The upper mold part and the lower mold part are engaged together so as to form a cavity for forming stoppers as shown in FIG. 10, and then molten resin (for example, nylon) is poured and filled into the cavity through a pouring part 31. After the resin has been filled in the cavity and compressed and maintained for a desired period under these condition, the members 22 and 25 are then withdrawn in the directions shown by arrows (B) and (C) respectively as shown in FIG. 12. In this condition, the members 21a, 21b and 24b are allowed both to move together in the direction shown by arrow (A). In FIG. 12, the members 22 and 25 are shown in the position where they are opened a minimum distance, but if desired, they may be opened a further distance as shown by broken lines.

Figure 13:
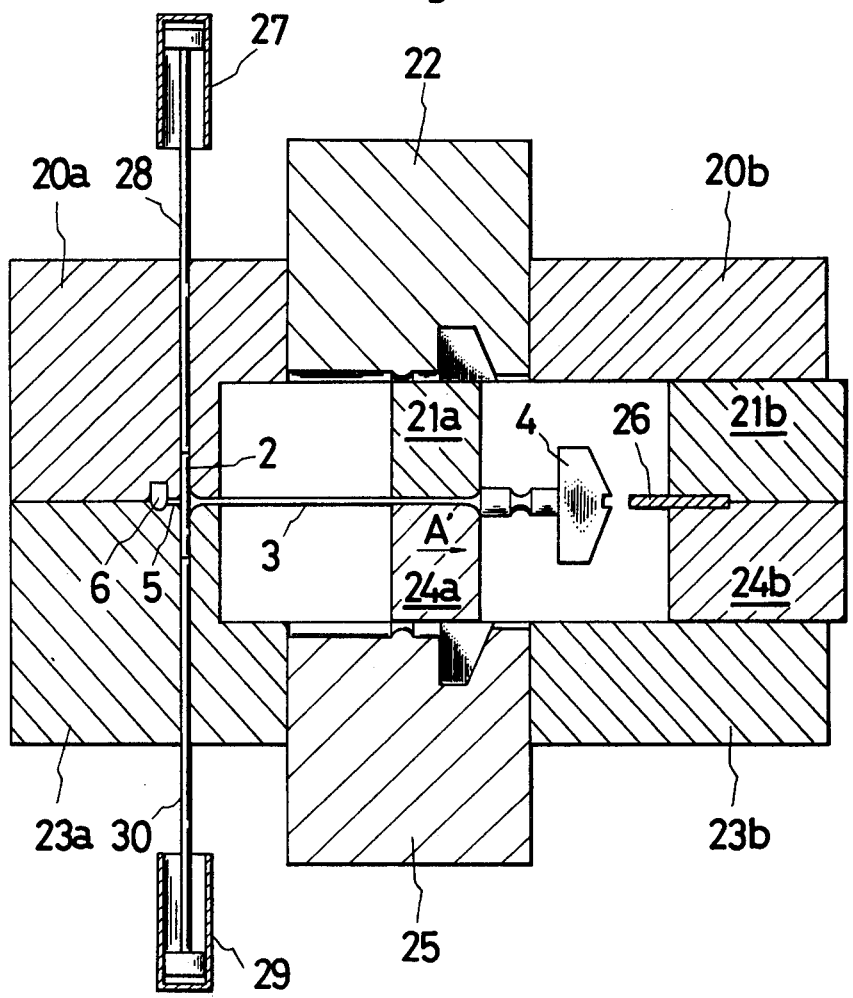
Figure 14:
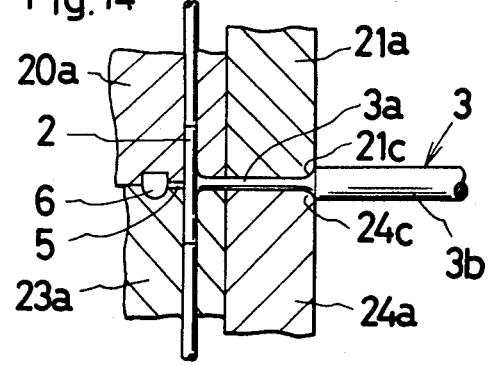
FIGS. 14 and 15 are enlarged views showing stretching processes of the filament portions.

Next, as shown in FIG. 13, the members 21a and 24a are both moved in the direction indicated by arrow (A') so as to stretch the filament portion 3. FIG. 14 shows the arrangement prior to subjecting the filament portion 3 to the stretching process, where the smaller-diameter filament portion 3a is molded by means of the members 20a, 23a, 21a and 24a and these members are held in that position. As shown, the members 21a and 24a have arc portions 21c and 24c on the right sides thereof respectively in FIG. 14, and at this point the large-diameter filament portion is connected with the smaller-diameter filament portion 3a. The arc portions 21c and 24c serve cooperatively as a drawing die to stretch the filament portion. Therefore the shape of the arc portions 21c and 24c should be selected such that the filament portion can not be cut off during stretching process. Particularly in a metal mold for high speed stretching, the shape of said arc portion is important, and it is necessary to effect the necking operation smoothly.

Figure 15:
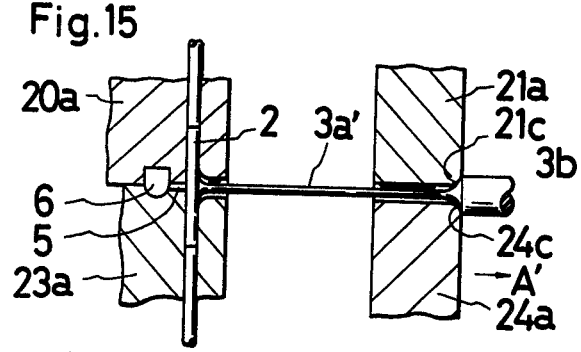

Then, the members 21a and 24a are moved in the direction of an arrow (A') in FIG. 15, so that the smaller-diameter filament portion 3a is first stretched. After a normal increase in stretching is attained on this portion thereby resulting in formation of a stretched filament portion 3a', the larger-diameter filament portion 3b begins to also be drawn to an extent into the arc corners 21c and 24c and thereby to be stretched.

Figure 16:
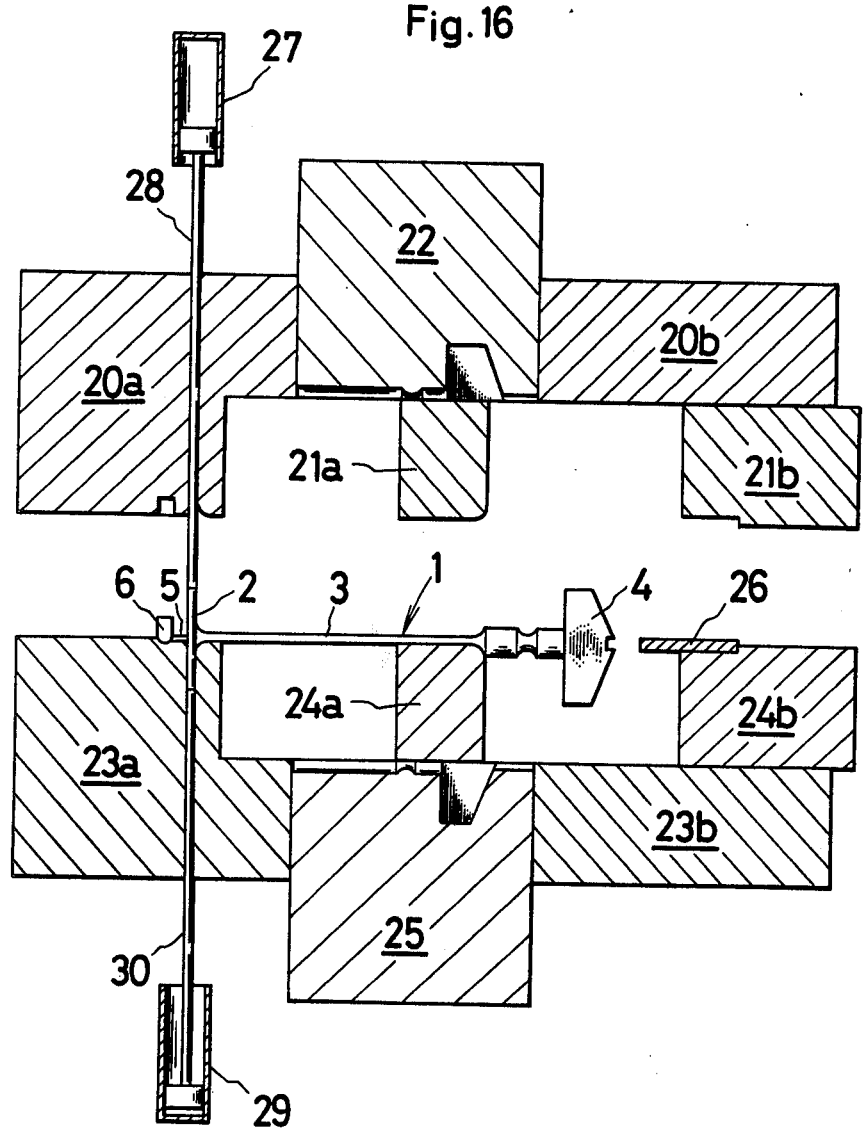

As described above, after the filament portions have been stretched to a desired length, the product is removed from the metal mold. For this purpose, the push-out pin 28 is projected by means of the piston 27 to push the crossbar 2 of the stopper 1 out of the metal mold member 20a while the whole of the upper metal mold part is moved up as shown in FIG. 16. In this way, the stoppers are supported by the lower metal mold. In the stretching process of the filament portion shown in FIG. 13, as the larger-diameter filament portion is being stretched, the unstretched portion becomes shorter, with the result that the support plate 26 is automatically separated from the head 4, and as shown in FIG. 16, the support plate 26 is completely separated from the head 4, the plate 26 being adapted to hold the head 4 after the molding has finished.

Figure 18:
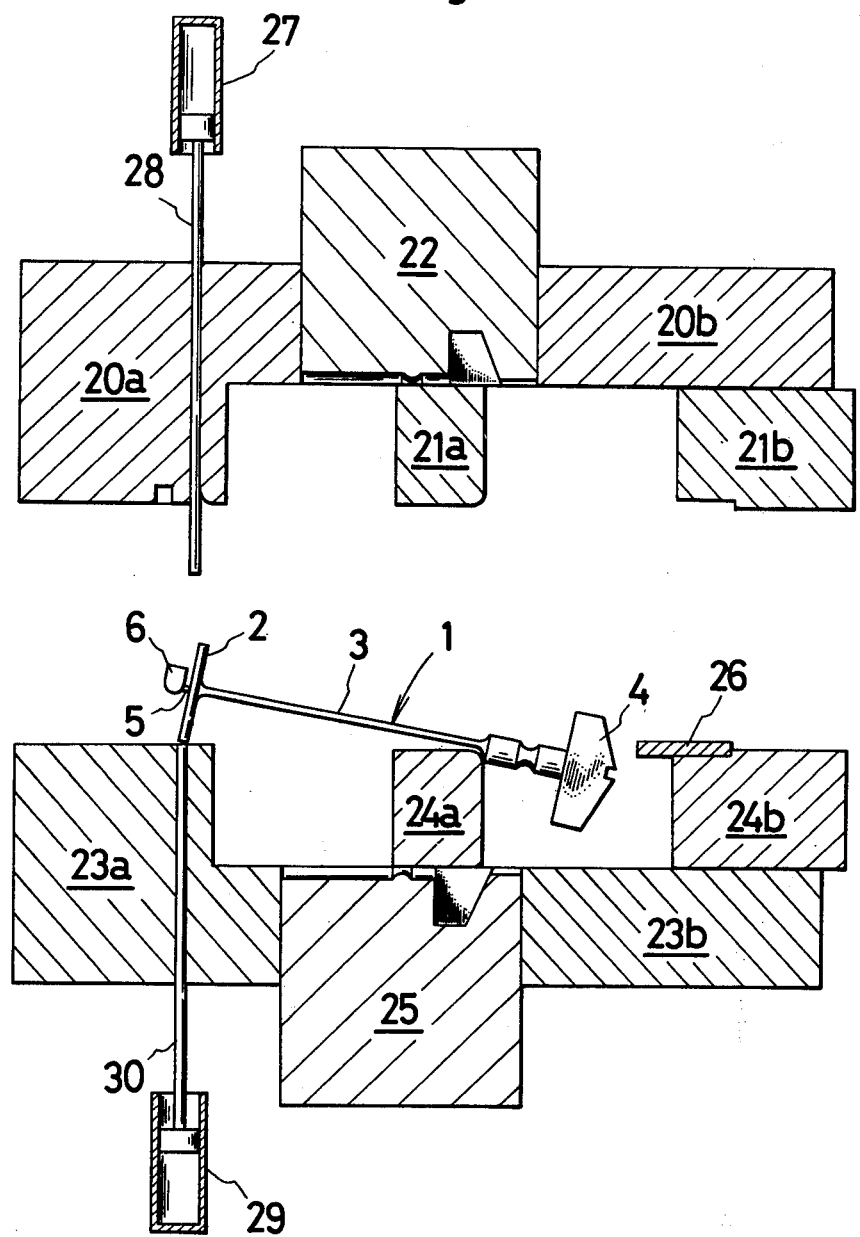

As described above, the stoppers 1 are removed from the upper mold members, and after the entire upper mold part is raised to make removal of the stoppers 1 easy as shown in FIG. 17, the piston 29 is operated to raise the pin 30, so that the crossbars 2 can be removed from the cavity of the member 23a. Thereafter the stoppers 1 are discharged from this stopper producing apparatus by means of, for example, an air jet or a mechanical taking-out device as shown in FIG. 18.

The present invention has the feature that in case the filament portions of a blank of a group of stoppers are subjected to the stretching, a tension is locally applied mainly to the filament portions thereby causing the necking. This is different from the prior art wherein tension is applied to the whole length of the filament portions at one time by gripping the crossbars and heads and moving them away from each other. Another feature of the present invention is to stretch the filament portions by means of a mechanism such as used for wire drawing through a die, thereby resulting in the following effects:

(A) It is possible to produce stoppers each having a filament portion of reduced cross section near the head as shown in FIGS. 4 and 6, and also stoppers each having a filament portion of special cross section such as shown in FIG. 7, and stoppers having special shapes such as shown in FIGS. 8 and 9.

(B) In prior art molding techniques, push-out pins for pushing out the heads and crossbars are necessary, but according to the present invention, push-out pins for pushing out the heads are not necessary. Therefore the present invention has a good mold-separating property, which permits good removal of product from the metal mold.

Futher, burrs which are apt to occur when push-out pins are provided do not occur at least in the head.

(C) In the present invention, since the filament portions are stretched by means of a mechanism similiar to wire drawing devices using a drawing die, it is unnecessary to provide a taper in the filament portion to set a stretching start point and adjust a stretching length, and it is possible to stretch a plurality of filament portions of stoppers correctly and still uniformly.

(D) The present invention employs a mechanism in which the filament portion is stretched with the necking positively produced thereon, and therefore according to the present invention, the stretching can be done at a speed twice as fast as that of prior art techniques.

(E) According to the prior art, it is necessary to provide push-out pins on both sides of the crossbar and head in order to remove the finished product from the metal mold, however according to the present invention, the number of push-out pins can be reduced to half, thereby making the production of the metal mold very easy.

The invention is not limited by the details of the embodiment above described and these details could be modified without departing from the scope of the invention.

What is claimed is:

1. A method of making stoppers by subjecting filament portions thereof to stretching, said stoppers each including a crossbar, a filament portion and a head molded integrally from synthetic resin, said method comprising providing a filament portion having a smaller-diameter filament portion near said crossbar and a larger-diameter filament portion extending from said smaller-diameter filament portion toward the head at least on a portion of the filament to be stretched, engaging said smaller-diameter filament portion within two opposed die means for molding and drawing said filament, and moving the die means proximate to the molded head apart from the other die means toward the molded head, thereby extending the filament portion by exerting a stretching force on said smaller diameter filament and causing a portion of said larger-diameter filament portion to be drawn through an arc shaped opening in said moving die means.

2. A method of making stoppers according to claim 1, wherein said larger-diameter filament portion has a portion of reduced cross section proximate to the head, which has not been effected by drawing.

3. A method of making stoppers according to claim 1, wherein the stopper has an enlarged portion in the neck portion between the filament portion and the head.

4. A method of making stoppers according to claim 1, wherein the stopper has a projection in the neck portion between the filament portion and the head.

5. A method of making stoppers which includes a head, a crossbar and a filament portion interconnecting said head and crossbar wherein said filament portion comprises a smaller diameter filament portion near the crossbar and a larger diameter filament portion extending from said smaller diameter filament portion toward the head at least on a portion of the filament to be stretched, said method comprising:
(a) introducing a molten resin into a mold comprising mold means for said crossbar, mold means for said smaller diameter filament portion adapted to act as die means for extending said filament portion and mold means for the larger-diameter filament portion and the head,;
(b) opening said mold means for the larger diameter filament portion and the head of said stopper blank laterally to the filament portion;
(c) moving said mold means for the smaller diameter filament portion longitudinally toward the molded head, thereby extending the filament portion by exerting a stretching force on said smaller diameter filament portion and causing a portion of said larger diameter filament portion to be drawn through an arc shape opening in said mold means; and
(d) opening said mold members for the crossbar and said mold members for the smaller diameter filament portion to remove the stopper therefrom.

6. The method of claim 5 wherein said head is removably attached to support means for holding said head disposed at the end of the head remote from said larger diameter filament.

* * * * *